Dec. 23, 1947. P. E. PEARSON ET AL 2,433,061
APPARATUS FOR FILLING CONTAINERS WITH MEASURED CHARGES OF MATERIAL
Filed July 23, 1943 15 Sheets-Sheet 1
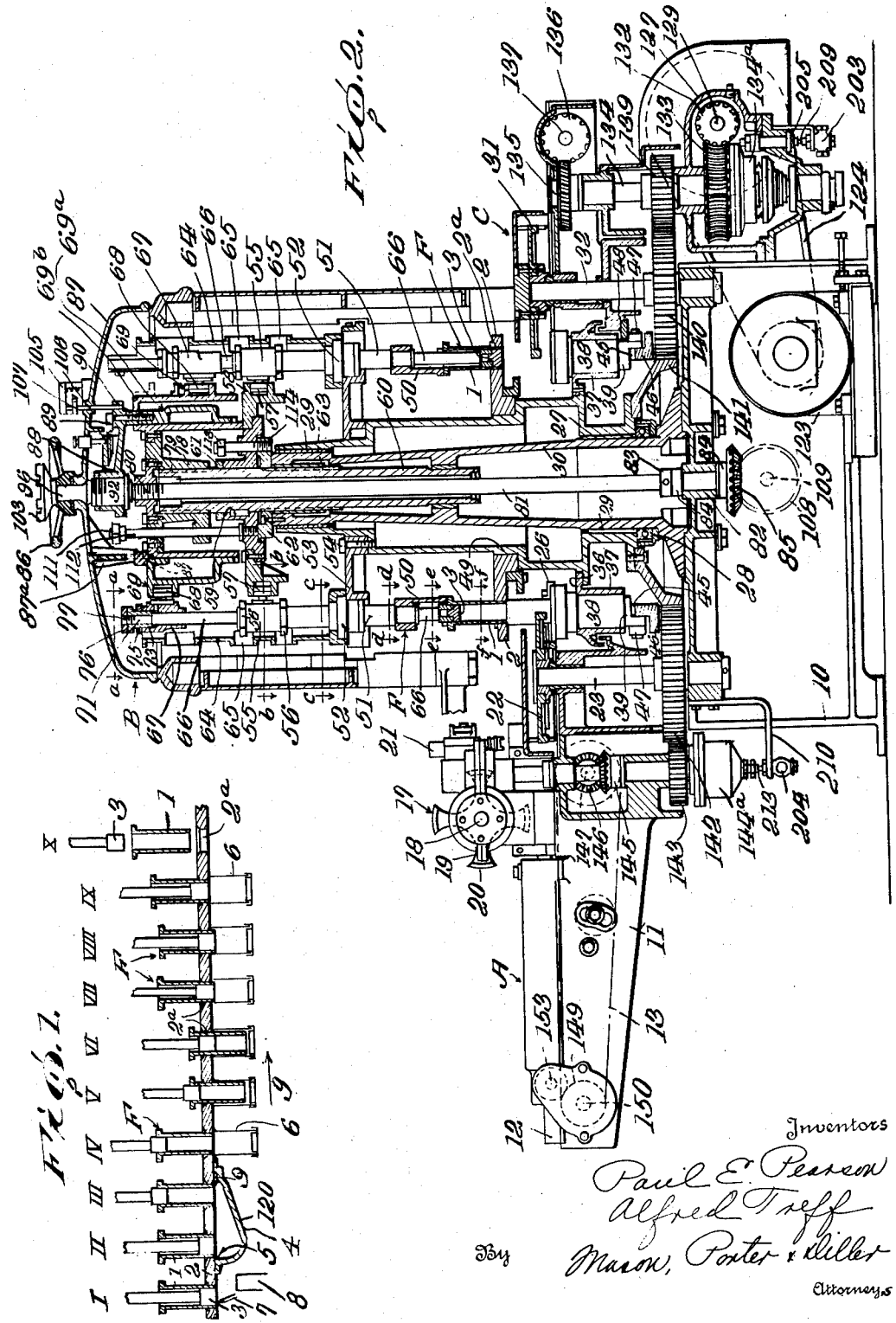
Inventors
Paul E. Pearson
Alfred Treff
By Mason, Porter & Diller
Attorneys

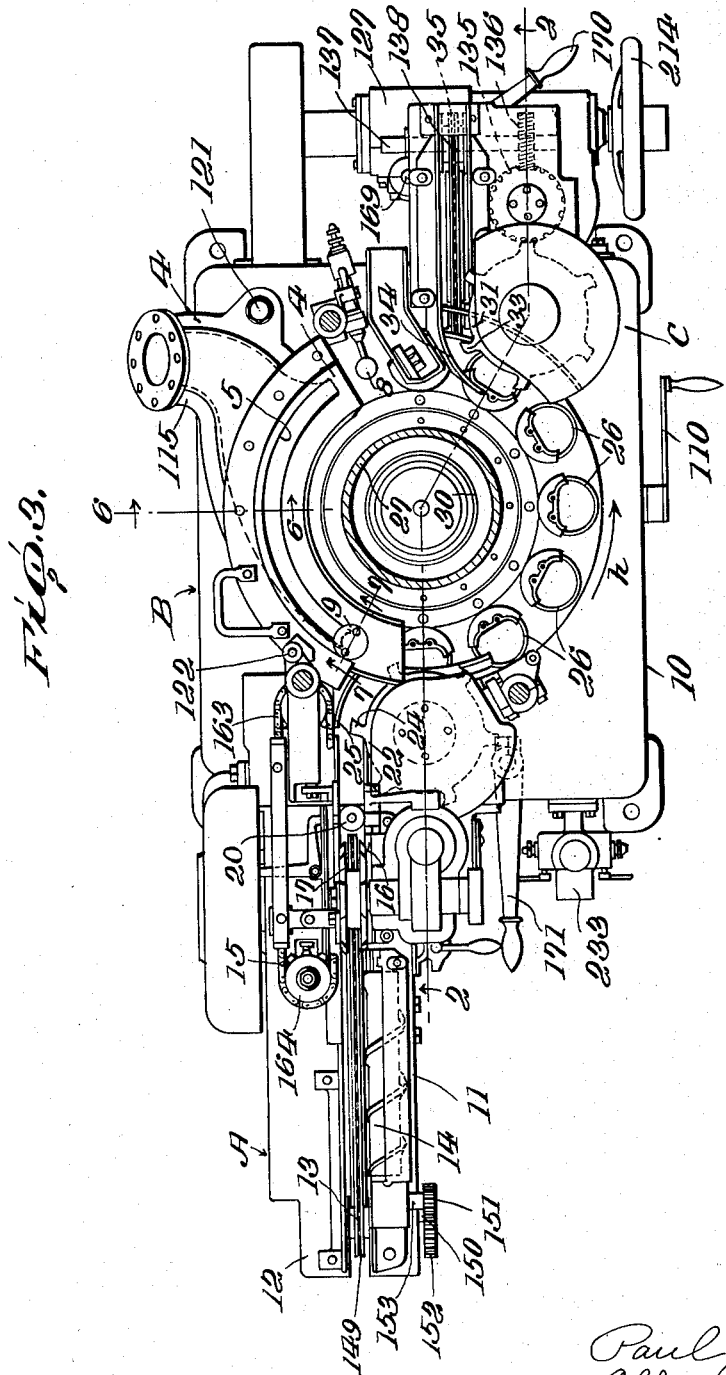

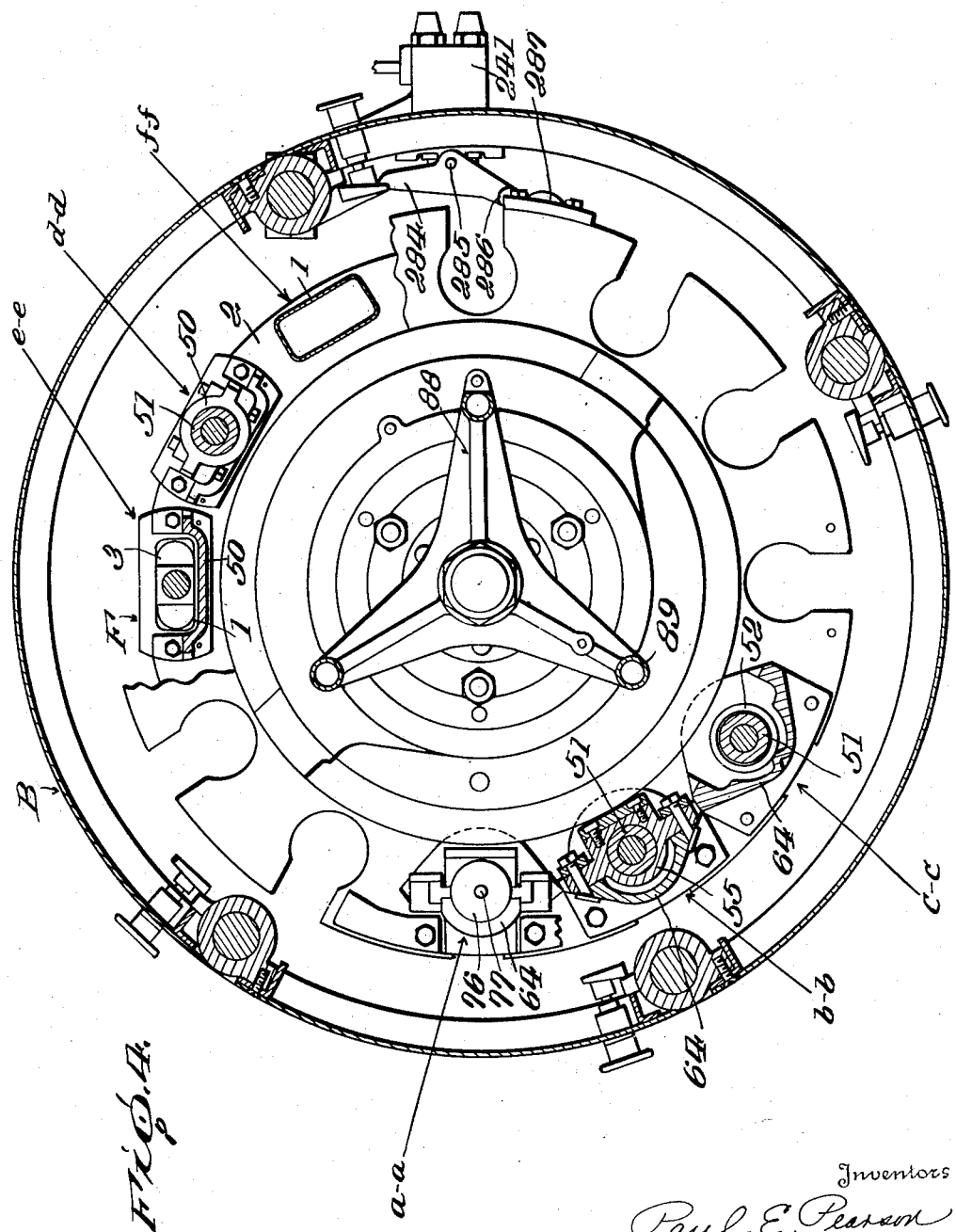

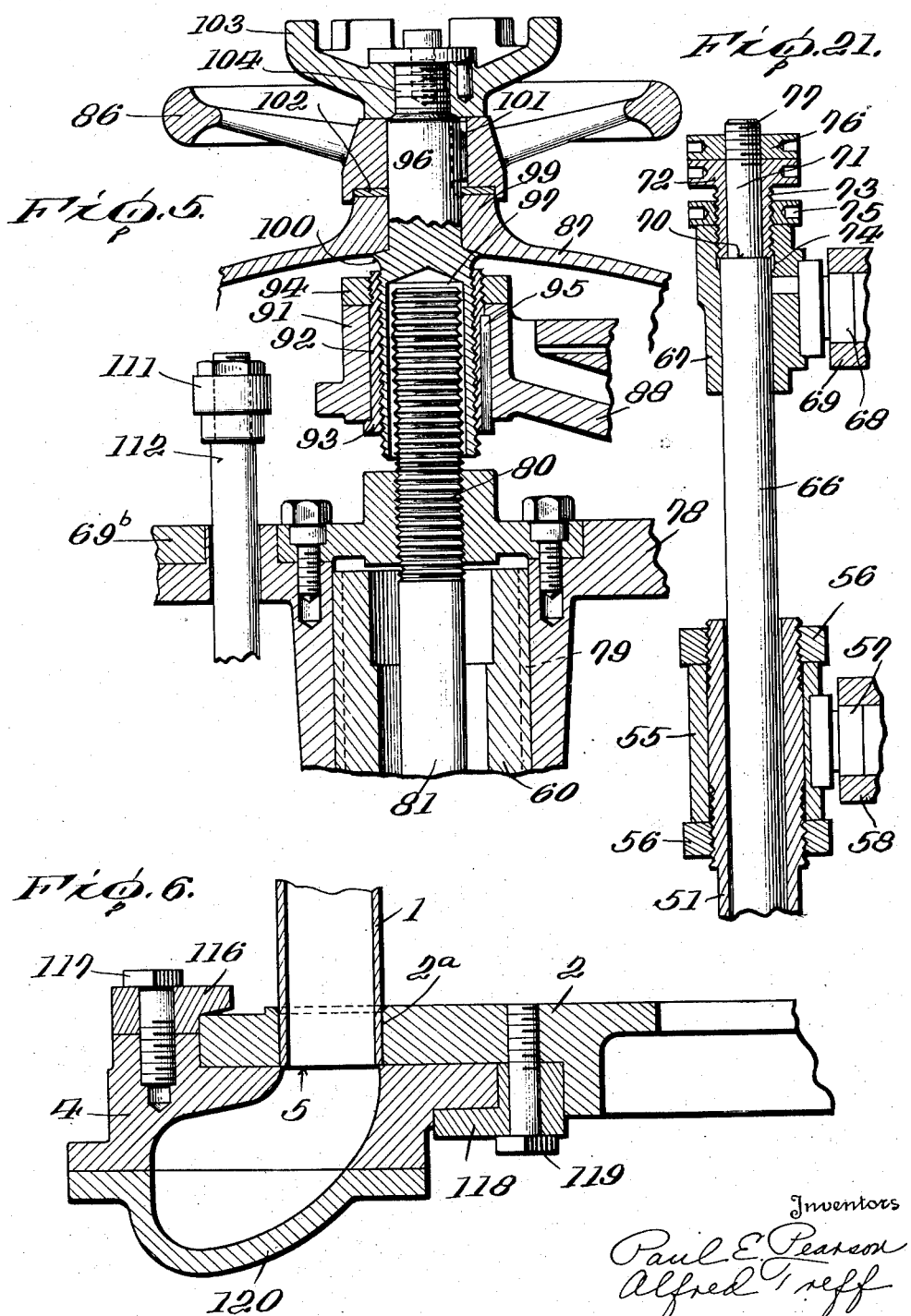

Inventors
Paul E. Pearson
Alfred Treff
By Mason, Porter & Diller
Attorneys

Dec. 23, 1947.    P. E. PEARSON ET AL    2,433,061
APPARATUS FOR FILLING CONTAINERS WITH MEASURED CHARGES OF MATERIAL
Filed July 23, 1943    15 Sheets-Sheet 9

Inventors
Paul E. Pearson
Alfred Treff
By Mason, Porter & Diller
Attorneys

Dec. 23, 1947.　　　P. E. PEARSON ET AL　　　2,433,061
APPARATUS FOR FILLING CONTAINERS WITH MEASURED CHARGES OF MATERIAL
Filed July 23, 1943　　　15 Sheets-Sheet 10
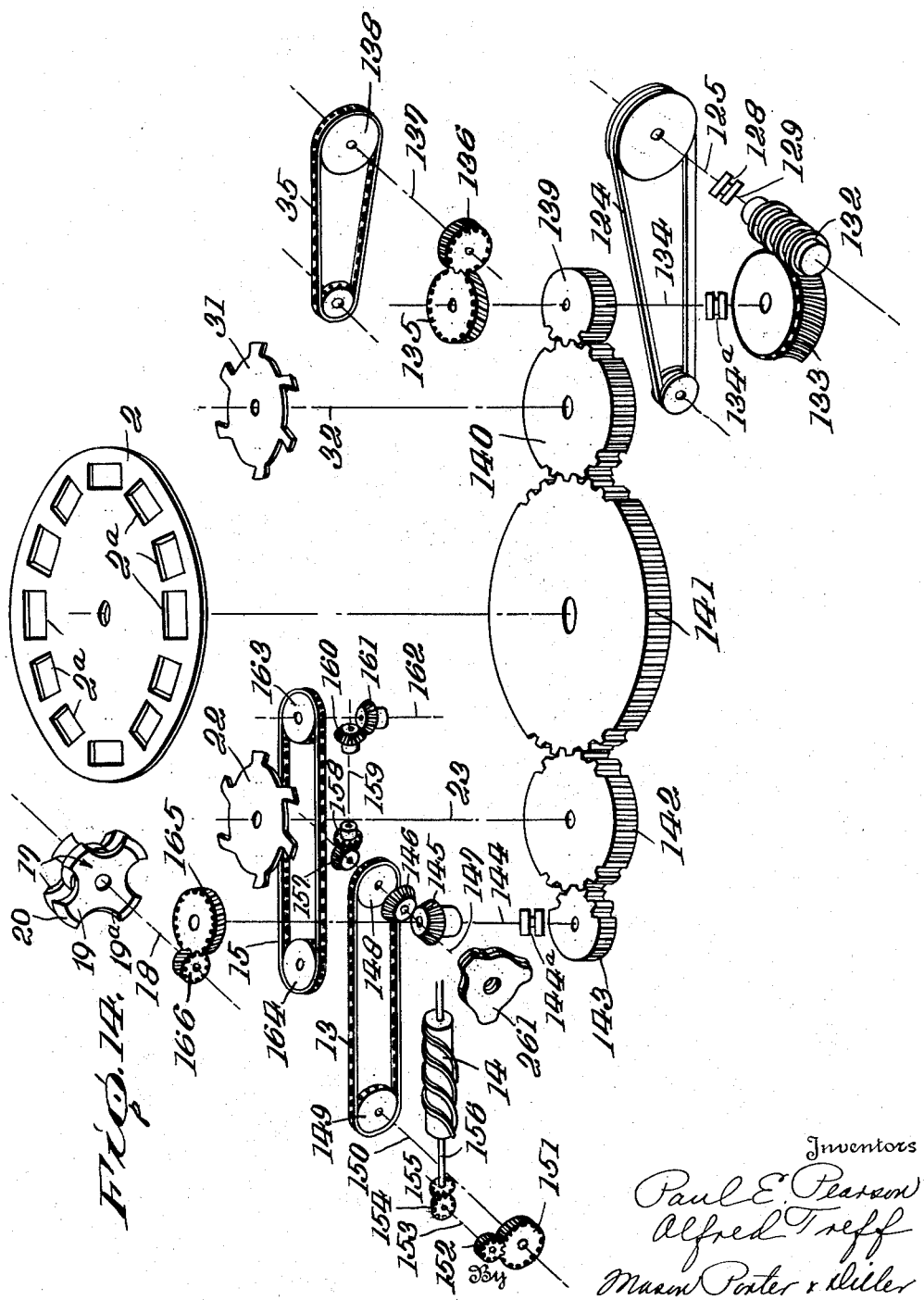
Inventors
Paul E. Pearson
Alfred Treff
By Mason, Porter & Diller
Attorneys

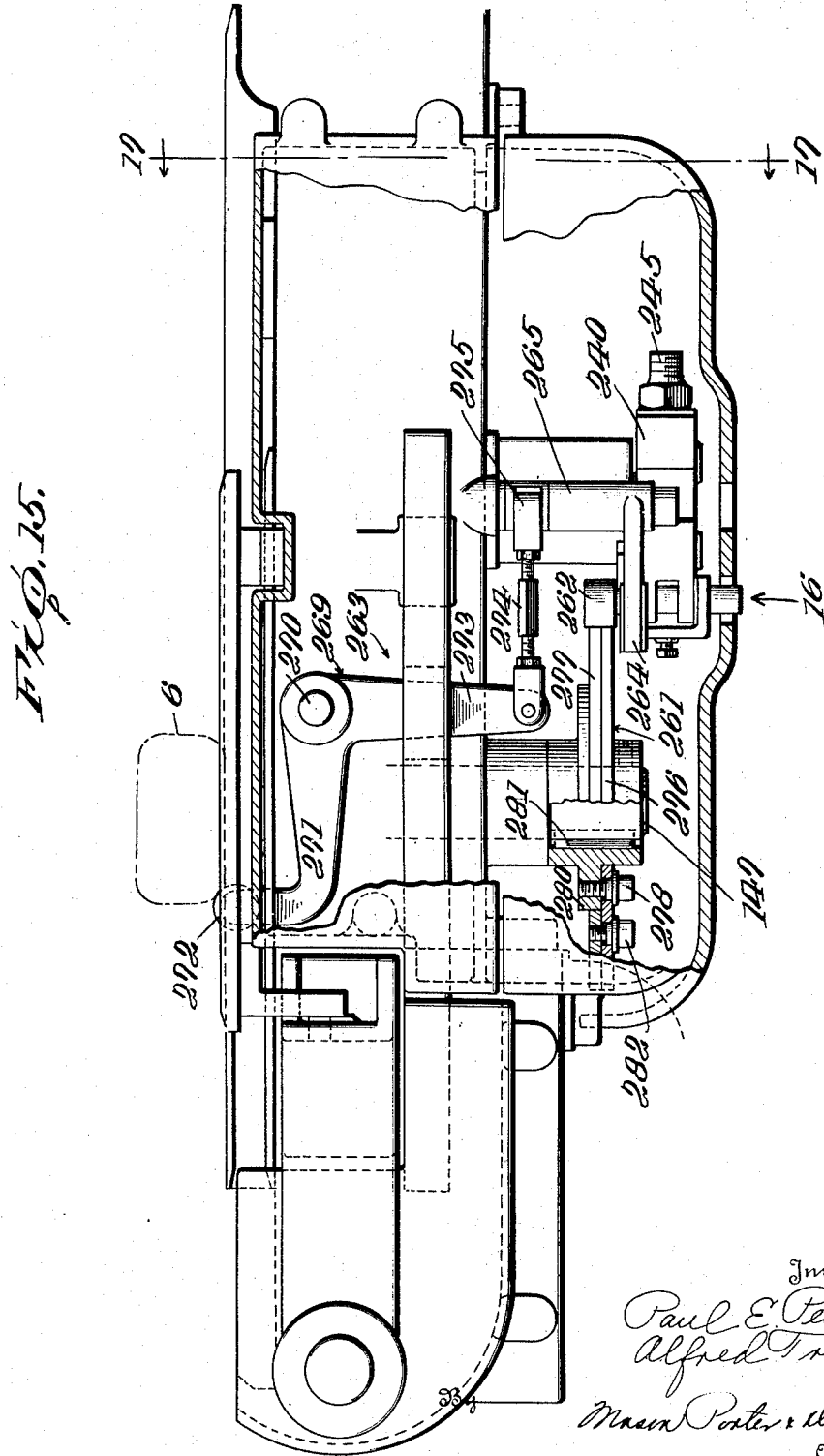

Dec. 23, 1947. P. E. PEARSON ET AL 2,433,061
APPARATUS FOR FILLING CONTAINERS WITH MEASURED CHARGES OF MATERIAL
Filed July 23, 1943 15 Sheets-Sheet 12

Inventors
Paul E. Pearson
Alfred Treff
By Mason Porter & Diller
Attorneys

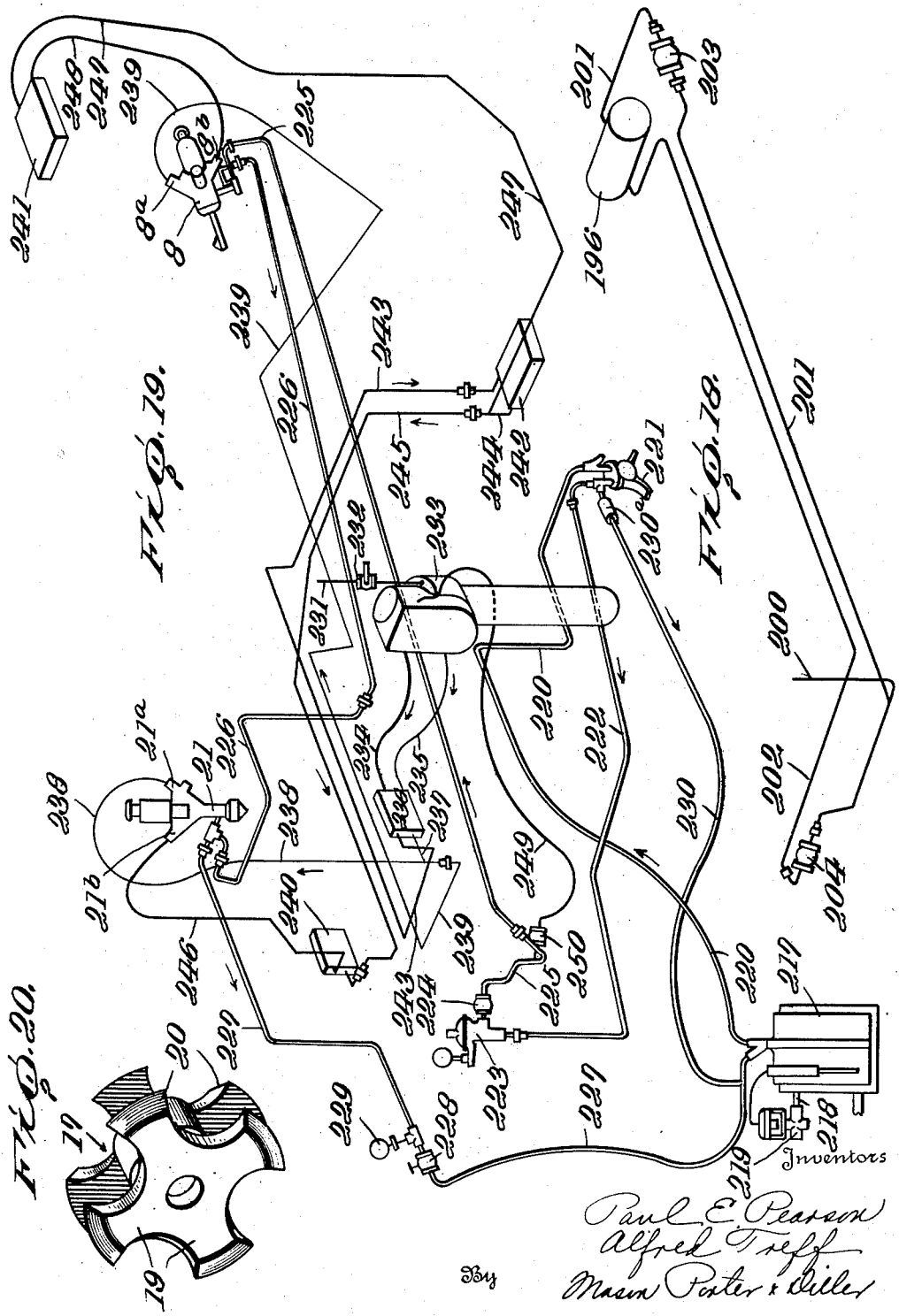

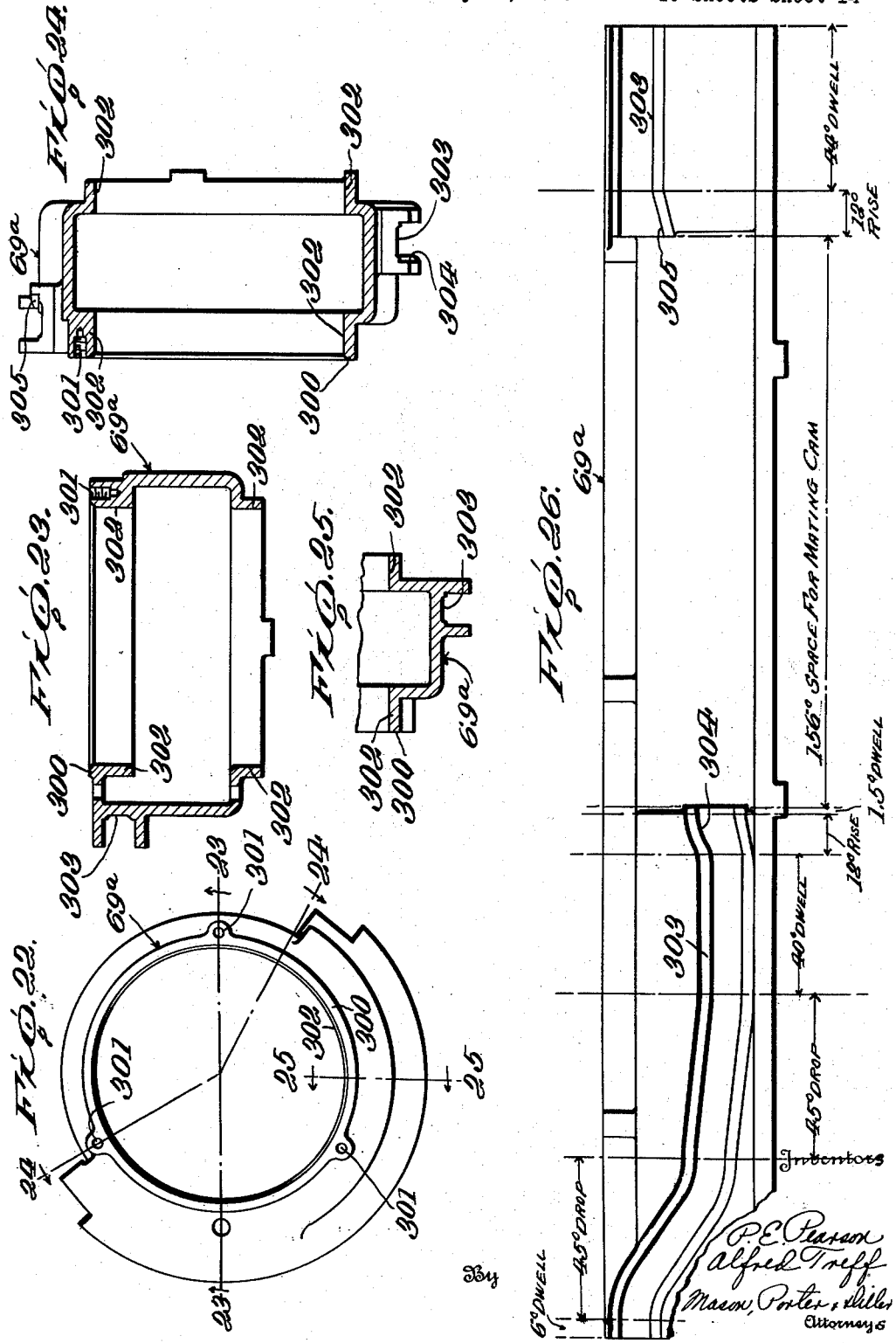

Dec. 23, 1947.  P. E. PEARSON ET AL  2,433,061
APPARATUS FOR FILLING CONTAINERS WITH MEASURED CHARGES OF MATERIAL
Filed July 23, 1943  15 Sheets-Sheet 15
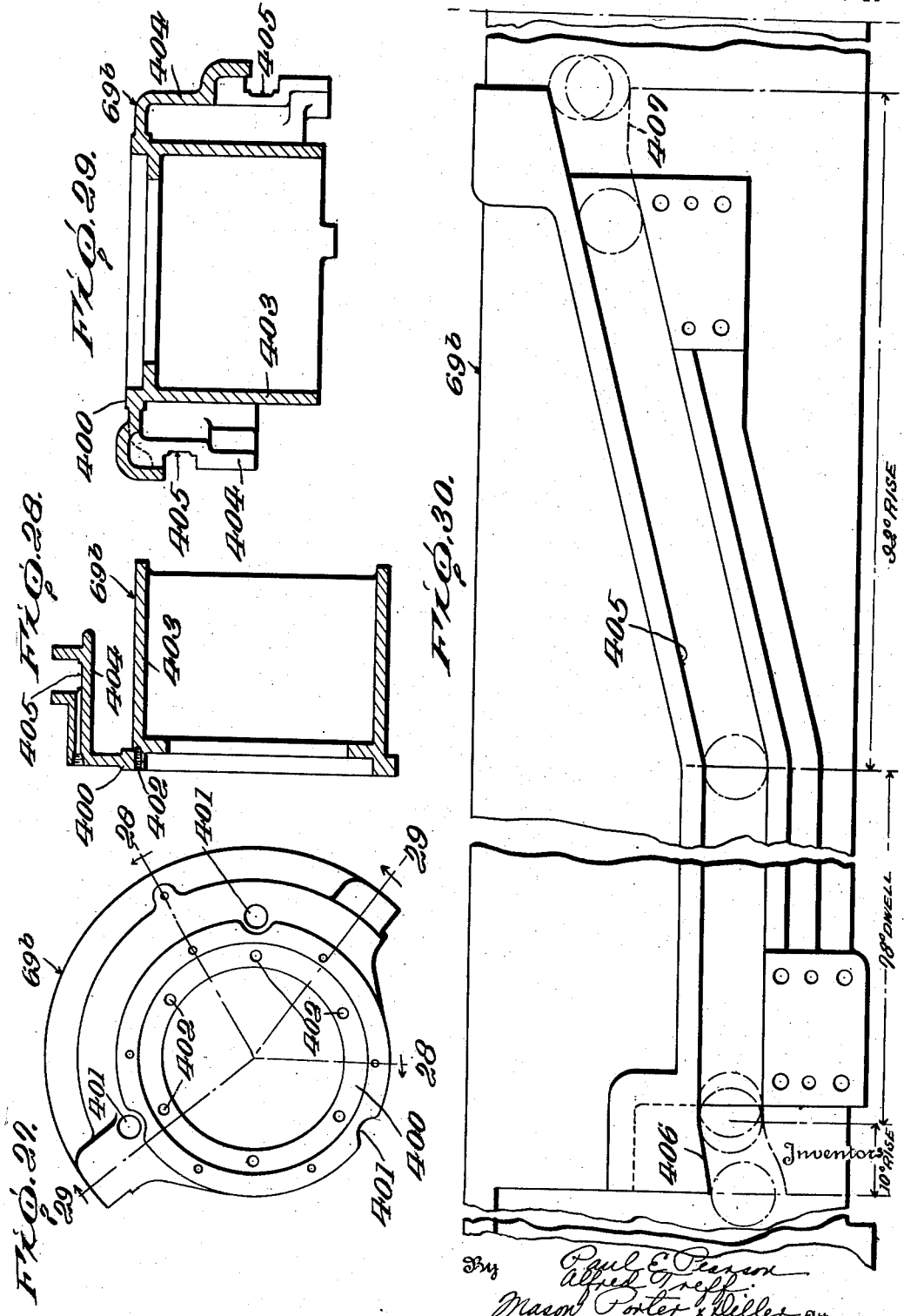

Patented Dec. 23, 1947

2,433,061

UNITED STATES PATENT OFFICE 2,433,061

APPARATUS FOR FILLING CONTAINERS WITH MEASURED CHARGES OF MATERIAL

Paul E. Pearson and Alfred Treff, Chicago, Ill., assignors to Continental Can Company, Inc., New York, N. Y., a corporation of New York Application July 23, 1943, Serial No. 495,886

7 Claims. (Cl. 226—68)

This invention relates to an apparatus for filling containers and more particularly to apparatus for filling containers with bulk material which, although not intrinsically fluid or flowable, is capable of being caused to flow when subjected to pressure. The invention is applicable to the filling of containers from a bulk supply of prepared meat product, but is applicable for the packing of other bulk materials.

An object of the invention is to provide apparatus of the kind referred to and in which the parts contactible by the material may readily be made accessible for cleaning without disassembling the apparatus.

Another object of the invention is to provide an apparatus of the character stated wherein there are included a rotatable turret, a plurality of filling units movable with the turret and each including a measuring spout and a plunger reciprocable therein for measuring and depositing fill charges into containers, a table movable with the turret and having openings therein through which the filling units operate, means for supporting containers in position for receiving fill charges from the filling units, means for operating the spouts and plungers, and devices for removing the spouts from the table openings and the plungers from the spouts for cleaning purposes, without disassembly of the units and their mountings.

Another object of the invention is to provide apparatus of the character stated including equipment for applying hot grease to the empty containers prior to their being filled and for applying hot grease to the filling unit.

Another object of the invention is to provide cyclically operable filling apparatus of the character stated including mechanism for readily varying the measuring capacity of the several filling units simultaneously to condition the apparatus for filling containers of different sizes.

Another object of the invention is to provide an apparatus of the character stated in which there are included, in addition to the means for displacing the spouts and plungers for cleaning purposes, means for individually adjusting the positions of the spouts and the plungers, and also means for collectively adjusting the relative positions of the spouts and plungers to vary the sizes of the fill charges measured thereby.

Another object of the invention is to provide in apparatus of the character stated means for feeding the fill to the spouts and including a manifold engaging in sliding contact with a face of the table and having a discharge mouth, and means shiftably mounting the manifold for movement between an effective position with its mouth registering with the table openings and an ineffective position outwardly of the periphery of said table where it is readily accessible for cleaning purposes, said manifold and table having gibs automatically effective upon movement of the manifold to its effective position to engage with the table and the manifold respectively and hold the opposing faces thereof in effective sealing contact during movement of the table.

Other objects will become apparent from a reading of the following description, the appended claims and the accompanying drawings, in which:

Figure 1 is a schematic view depicting a typical sequence of operations performed in practicing the method of filling containers in accordance with the invention;

Figure 2 is a vertical sectional view of apparatus embodying the invention, the section being taken on the irregular line 2—2 of Figure 3.

Figure 3 is a view showing container feeding and filled container discharging mechanism in top plan, and a filling mechanism turret partly in section, filling units and operating mechanism therefor being omitted.

Figure 4 is an enlarged scale top view of the filling mechanism with some parts shown in plan and others in section at different planes as indicated by the lines a—a; b—b; c—c; d—d; e—e; and f—f in Figure 2.

Figure 5 is a fragmentary vertical sectional view on an enlarged scale, of mechanism for adjusting the height of cam means for varying the size of the charge to be placed in the containers, and for positioning parts of the filling units so as to facilitate their being cleaned.

Figure 6 is an enlarged scale fragmentary vertical sectional view on the line 6—6 of Figure 3 showing a manifold and filling mechanism associated therewith.

Figure 7 is an enlarged scale fragmentary sectional view on the line 7—7 of Figure 3 showing a cut-off or charge trimming knife in elevation.

Figure 14 is a diagrammatic perspective view of the complete drive train gearing.

Figure 15 is a fragmentary top view, partly in plan and partly in section, of valve mechanism responsive to the positioning of a container at a predetermined location for effecting spraying of hot grease into the container.

Figure 16 is a view looking in the direction of the arrow 16 in Figure 15, a mechanism cover being broken away so as to show cam operated valve mechanism in elevation.

Figure 17 (Sheet 5) is a section on the line 17—17 of Figure 15.

Figure 18 is a schematic layout or diagram of fluid pressure means for operating the main control clutch.

Figure 19 is a schematic layout or diagram of hot grease conduits, compressed air conduits, grease spray guns and controlling valves.

Figure 20 is a perspective view of an expander wheel.

Figure 21 (Sheet 4) is an enlarged scale fragmentary vertical sectional view of mechanism for reciprocating a spout and plunger.

Figure 22 is a top plan view of an adjustable cam section.

Figure 23 is a vertical section on the line 23—23 of Figure 22.

Figure 24 is a vertical section on the line 24—24 of Figure 22.

Figure 25 is a vertical section on the line 25—25 of Figure 22.

Figure 26 is a development in elevation of the cam section shown in Figures 22 to 25 inclusive.

Figure 27 is a top plan view of a non-adustable cam section.

Figure 28 is a vertical section on the line 28—28 of Figure 27.

Figure 29 is a vertical section on the line 29—29 of Figure 27.

Figure 30 is a development in elevation of the cam section shown in Figures 27 to 29 inclusive.

Figure 12:
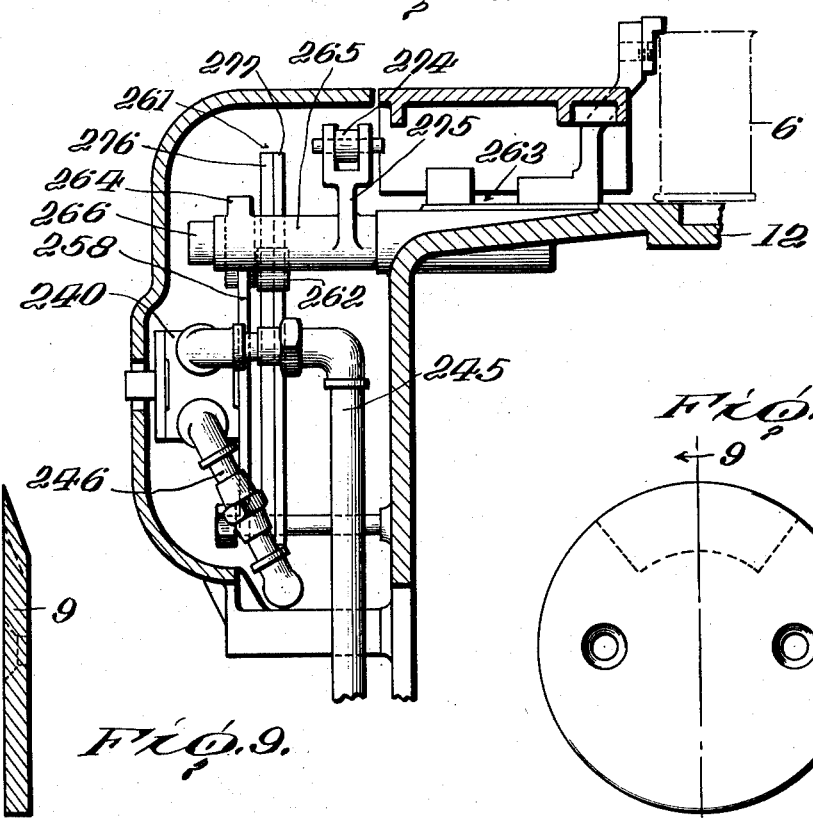
Figure 12 is an enlarged scale fragmentary vertical sectional view of mechanism including a container-carrying, turret-rotated pad, a transfer turret, container feeding and expanding means, and another safety or overload release clutch.
Figure 8:
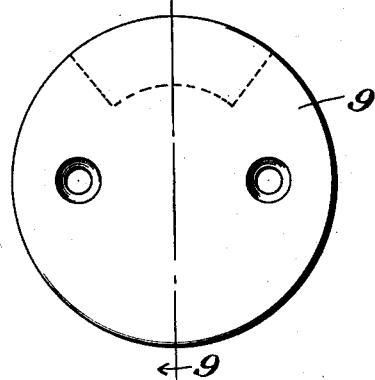
Figure 8 is a detail plan of the charge trimming knife.
Figure 9:
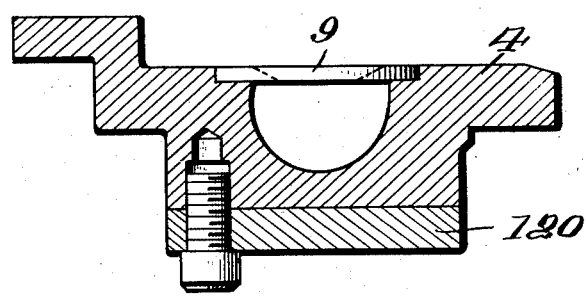
Figure 9 is a section on the line 9—9 of Figure 8.
Figure 10:
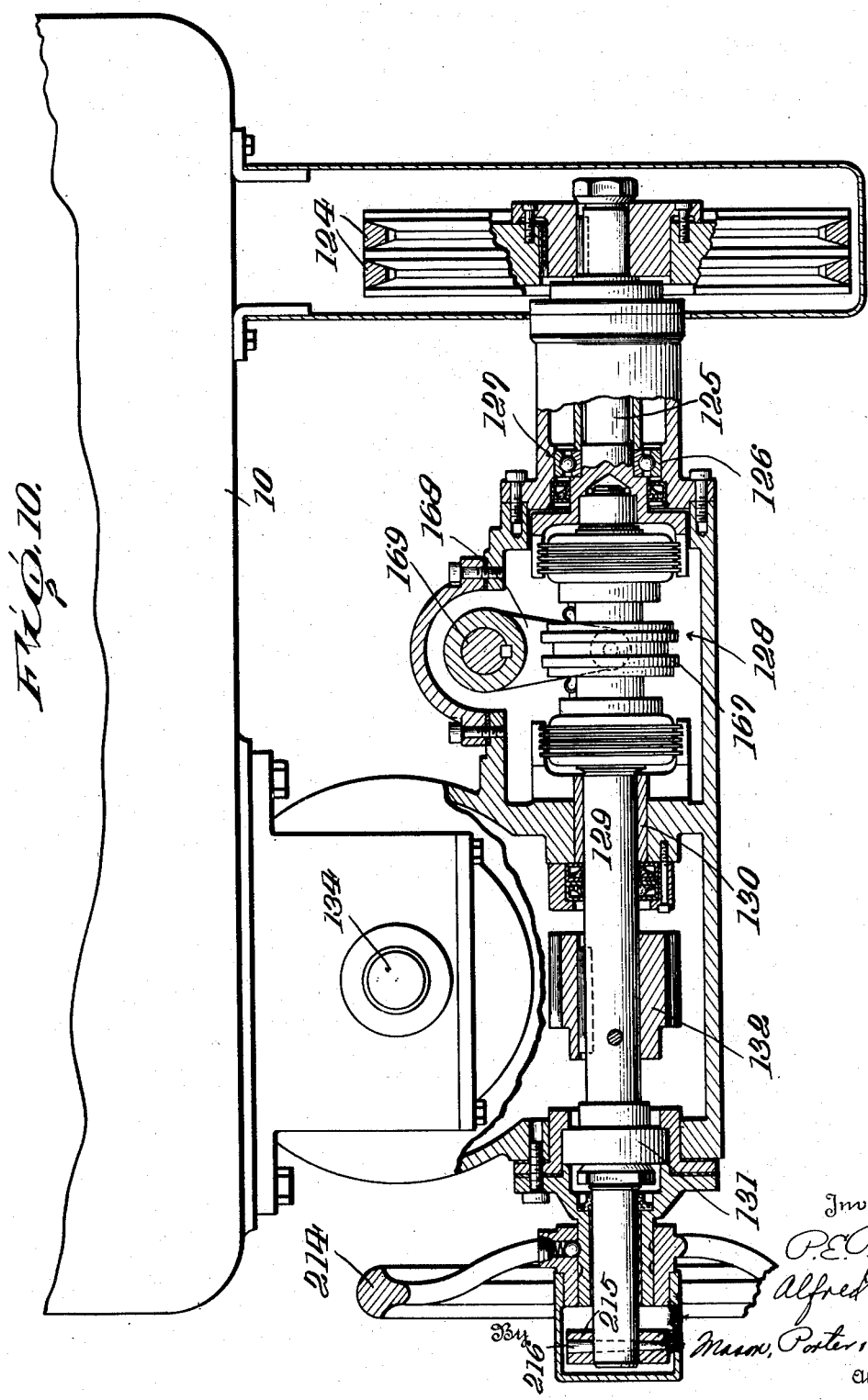
Figure 10 is an enlarged fragmentary top view partly in plan and partly in horizontal section, showing a main control clutch and associated driving and driven parts.

In practicing the improved method of filling containers in accordance with the invention, preformed measured charges of bulk material are inserted bodily in the containers. Figure 1 shows schematically an arrangement of parts for carrying out a preferred sequence of steps or operations for filling containers with bulk material, such for example as prepared or processed meat. It will be understood, however, that the method may be used in the filling of containers with other materials.

Figure 1 indicates a plurality of filler units generally designated F and each comprising a spout 1 reciprocable through a guide opening 2a in a table 2, and an expeller plunger 3 mounted to reciprocate in the associated spout 1. The table 2 is movable over and in sealing engagement with a meat manifold 4 having its mouth 5 facing upwardly for delivering meat into the measuring and filling units F. After each unit F receives the measured charge it moves past the manifold 4 and delivers the charge to a can or container 6. In commercial apparatus for carrying out the method, the table 2 may be circular and may be mounted on a rotatable turret. In the schematic showing of Figure 1, the table may be considered as a linear development of a rotatable table movable in the direction of the arrow g. The table should be kept free from adhering meat or foreign matter so as to insure good sealing engagement with the meat manifold, and to this end a scraper 7 is positioned on the approach side of the manifold and in wiping engagement with the bottom of the table 2. In order to provide lubrication between the bottom surface of the table and the top of the manifold 4, a spray gun 8 is arranged to discharge hot fluid edible grease, for example lard, on the bottom face of the table and on the approach side of the manifold 4.

In a preferred commercial apparatus to be described hereinafter, a plurality of filling units is carried by the rotatable table and each of the units comprises a spout 1 and plunger 3. In considering Figure 1 as illustrating the method, the successive representations of units F will be treated as showing successive positions of a particular filling unit at different stages of the filling operation. Such positions are indicated by the numerals I to IX inclusive. Position X represents the relative positions of the filler spout 1 and expander plunger 3 when the parts are to be cleaned, it being understood that during normal cyclic operation, the parts are not moved to position X.

Beginning with position I, the filler spout 1 and the expander plunger 3 both have their lower ends flush with the bottom of the table 2 as the unit F approaches the meat manifold 4. Just before the unit moves over the manifold, the bottoms of the spout and plunger and the adjacent lower surface of the table 2 are scraped clean by the scraper 7 and are then coated with hot lard delivered by the spray gun 8. The unit then moves to position II over the meat manifold and while moving across the manifold mouth 5, the spout 1 is held against vertical movement while the plunger 3 is retracted to the position shown at III. The meat in the manifold 4 is not inherently fluid or flowable but is maintained under pressure so that as the plunger 3 is moving upwardly meat will be pressed into the cylinder space under the retreating plunger. By the time the unit has arrived at the right hand side of the manifold, the plunger will have moved to its fully retracted position as at III, and the spout will move horizontally across a knife 9 which will slice the meat off cleanly flush with the bottom end of the sleeve 1.

When the unit F is moved to position IV a can, indicated at 6, will be placed under it in readiness to receive the measured charge of meat. Thereafter the can and unit are moved horizontally in registration with each other until the filling operation has been completed. While the can and unit are moving from position IV to position V, the spout 1 and plunger 3 are moved together into the can 6 until the lower end of the spout 1 is spaced slightly, for example about one-eighth inch, above the closed bottom end of the can. The spout is then stopped while the plunger is moved downwardly a little further so as to force meat laterally into the space between the can bottom end and the lower edge of the spout. The relative positions of the spout and plunger will then be as shown at VI.

After the spout has been stopped in its lowermost position as shown at V and VI, it is retracted until its bottom end moves to a position flush with the bottom end of the plunger as shown at VII. While the spout is being retracted, the charge of meat will be held down in the can by the stationary plunger.

After the parts have reached the relative positions shown at VII the spout and plunger are moved down together a short distance in order to securely pack the meat in the can, such movement of the parts being terminated when they have reached the positions shown at VIII. The meat having thus been securely packed in the can, the spout and plunger will both be moved upwardly until their lower ends are flush with the bottom of the table 2 as shown at IX in readiness to pass over the meat manifold again and perform another measuring and filling operation.

When it is desired to thoroughly clean the filling units F, the plunger 3 is moved completely out of the spout 1 and the spout is moved above the table 2 as shown at X.

Figures 2 to 21 show a preferred embodiment of the invention in commercial apparatus adapted to continuously fill a succession of cans or containers with measured charges of bulk material. The apparatus shown by way of example is particularly suited for the filling of square or rectangular cans, but apparatus embodying the invention may also be used for filling cans or containers of other types.

In its general nature the apparatus includes conveyor mechanism A for feeding cans 6 to filling mechanism generally designated B incorporating a plurality of filler units F of the kind previously referred to. Cans filled by the units F are delivered to a discharge conveying mechanism C which carries them away from the filling mechanism B. All of the mechanism A, B and C may conveniently be mounted on a frame 10.

The conveying mechanism A is carried on a frame extension or bracket 11 providing a feed table 12 on which the cans are placed for being moved toward the mechanism B by a conveyor chain 13. The chain 13 advances the cans into engagement with a timing screw 14 of a well known kind which spaces the cans properly and delivers them between a pusher feed chain 15 and stationary guide 16.

Inasmuch as in the filling of the cans the filler unit spouts 1 are to be inserted in the cans, it is important for the cans to be shaped accurately so as to receive the filler unit spouts snugly. In order to prevent the delivery of a can whose sides have been collapsed sufficiently to interfere with the insertion of a filler spout, an expander device is projected into each can as it is being moved by the pusher feed chain 15 so as to reshape the can and condition it for receiving the filler unit spout. In the form shown, the expander device comprises a wheel 17 rotatable on a shaft 18 and having a plurality of radial arms 19 formed with arcuate ends tapered at their sides as at 20. As each can moves under the wheel 17, a pair of juxtaposed wheel arms 19 turns down into the can and the tapered sides 20 of the arms 19 force or press the can sides outwardly. This removes any dents which the can side walls may have. The arms 19 are dished inwardly at 19a to provide clearance for passing over the can end walls as the wheel 17 turns in time with travel of the can on the conveyor 13. As will be explained more fully hereinafter the expander wheel also serves to detect the presence of any can which may be approaching the filler mechanism B in inverted position, the arrangement being such that as soon as an inverted can is engaged by the wheel 17, the whole apparatus is stopped.

After each can 6 moves past the expander wheel 17, it travels under a spray gun 21 which delivers a spray of hot edible grease or lubricant, for example lard, for coating the inside of the can. This prepares the can for receiving the meat, and also lubricates the can side walls so as to ease the sliding of a filler spout 1 down into the can.

After being sprayed with the hot grease, each can is carried further by the pusher chain 15 until it is engaged by a transfer turret 22 mounted on a shaft 23. The turret 22 is formed with can engaging fingers 24 which in cooperation with a fixed arcuate guide 25 deliver the can to one of a plurality of seats or pads 26 on a main filling turret 27 which is mounted to rotate on a thrust bearing 28 and radial bearings 29 on a fixed column 30 supported by the frame 10. The cans are filled while moving on the turret 27 in the direction of the arrow h in Figure 3. After being filled, the cans are moved to a discharge turret 31 carried on a shaft 32. The turret 31 is provided with fingers 33 which engage the filled cans and move them along fixed arcuate guide 34 onto a discharge conveyor chain 35 which carries the filled cans away from the filling apparatus. The turret 27 acts as a conveyor for moving the units F cyclically to the filling manifold 4, thence to a delivery station between the transfer turret 22 and the discharge turret 31 and thence back to the manifold.

The conveying mechanism A, the expander wheel, the filling mechanism B, and the discharge conveying mechanism C are all driven in timed relation with each other by mechanism to be described hereinafter.

Referring now in more detail to the filling mechanism B, a rim 36 bolted to the turret 27 is formed with a plurality of circumferentially spaced guides 37 equipped respectively with bored liners 38. Sleeves 39 reciprocable respectively in the liners 38 are bored to receive for sliding movements stems 40 which depend from the can pads 26 (see Figures 2 and 12). The sleeves 39 are counter-bored to accommodate springs 41 having their opposite ends seated respectively against the bottoms of the counter-bores and shoulders 42 on the stems 40. The springs 41 urge the can pads 26 upwardly with respect to the sleeves 39 and permit a cushioned yielding of the pads 26 downwardly. Relative axial movement between the sleeves and can pads is limited by the engagement of pins 43 anchored in the stems 40 with the ends of slots 44 formed in the sleeves 39.

In operation, after a can is delivered on one of the pads 26 the can is moved in the direction of the arrow h in Figure 3. Before arriving at the discharge turret 31, the pad 26 and supported can 6 are raised to position the can for having the charge of material inserted therein by a filling unit F. After receiving the material charge the pad 26 and can 6 are lowered to position the can at a level for being engaged by the discharge turret 31. For raising the pads 26 each associated sleeve 39 is provided with a follower roller 45 cooperable with a stationary cam 46 carried by the frame 10. For lowering the pads 26 each associated sleeve 39 is provided with a follower roller 47 engageable with the bottom face of a stationary cam 48 carried by the frame 10 (see Figures 2 and 12).

As shown in Figure 2 the circular guide table 2 previously referred to is mounted as at 49 on the main conveyor turret 27. The table is formed with a plurality of circumferentially spaced guide openings 2a each of which is positioned directly above one of the pads 26. Each guide opening mounts for vertical reciprocation one of the spouts 1 which in turn mounts for independent vertical reciprocation an associated plunger 3.

For reciprocating the spouts 1, each spout is connected at its upper end to a vertically extending arm 50 secured at its top to a sleeve or tube 51 mounted to slide vertically in a bearing 52 carried by a table 53 bolted as at 54 to the turret 27. Secured to the top end of each tube 51 is a sleeve 55 equipped with adjusting and lock nuts 56 having threaded engagement with the associated tube 51 for holding the sleeve 55 in adjusted position on the tube. Journaled on each sleeve 55 is a follower roller 57 cooperable with the groove in a non-rotatable cam 58. The cam 58 is keyed as at 59 to a guide sleeve 60 and is held on the sleeve 60 by a nut 61. Normally the cam 58 rests on the top flange of a bearing member 62 secured to the top of the fixed column 30. The guide sleeve 60 is splined at 63 to the bearing 62 so as to be movable vertically with respect to the fixed column 30 but is maintained against rotation.

In operation, the turret 27 rotates the guide table 2, the table 53, the spouts 1, the arms 50, the tubes 51, the sleeves 55 and the rollers 57 while the cam 58 remains stationary. The contour of the groove in the cam 58 is such as to move each spout 1 cyclically to the positions shown at I to IX in Figure 1.

The upper and lower limits of movement of the spouts 1 may be varied individually so as to assure proper positioning of the spouts with respect to the guide table 2 and the cans 6. For this purpose the nuts 56 may be turned and the sleeves 55 thus adjusted vertically relatively to the tubes 51. The upper ends of the tubes 51 and the sleeves 55 are positioned inside of brackets 64 carried by the table 53. The brackets 64 are formed with access openings 65 through which a tool may be inserted for adjusting the nuts 56.

The plungers 3 are reciprocable in response to rotation of the turret 27 independently of reciprocation of the spouts 1. Each plunger 3 is secured to the lower end of a rod 66 which extends vertically and for sliding movements through an associated tube 51. A bracket 67 mounted on the top of each rod 66 is equipped with a follower roller 68 cooperable with grooves in a non-rotatable two-part cam generally designated 69.

In operation, the plungers 3, the rods 66, the brackets 67, and the rollers 68 move around the turret, the cam grooves moving the follower rollers 68 up and down so as to move the associated plungers 3 cyclically to the positions shown at I to IX inclusive in Figure 1.

In order that the elevation of the plungers 3 may be adjusted individually, each bracket 67 is adapted to be adjusted on the associated rod 66. As shown in Figure 21 (Sheet 4) each bracket 67 fits the associated rod 66 for vertical sliding movement. The rod 66 is shouldered as at 70 and is formed with a reduced end portion 71 on which an adjusting sleeve 72 is rotatably mounted. The sleeve 72 is exteriorly threaded as at 73 for engagement with an internally threaded bore in the bracket 67. The bracket 67 thus is suspended on the sleeve 72, the lower end of which abuts against and rests upon the rod shoulder 70. By turning the sleeve 72, the position of the bracket vertically with respect to the rod 66 can be changed. A lock nut 75 screwed on the sleeve 72 can be jammed against the top of the bracket 67 for preventing rotation of the adjusting sleeve 72 with respect to the bracket 67. Another lock nut 76 screwed onto a threaded portion 77 of the rod reduced end 71 can be tightened against the top of the adjusting sleeve 72 for preventing upward movement of the sleeve on the rod 66 and for preventing rotation of the sleeve on the rod 66. When the two lock nuts 75 and 76 are tightened, the bracket 67 is securely locked in adjusted position on the rod 66.

The cam 69 is so constructed as to enable variation of the range of movement of all the plungers 3 in unison throughout a portion of the circumferential travel of the units F, to increase or decrease the capacity of the spouts 1. The entire cam 69 also is adapted to be raised so as to lift the plungers 3 above the spouts 1 and to lift the spouts above the table 2, but this is for facilitating cleaning of the parts and is not for varying or adjusting the capacity.

The cam 69 comprises an adjustable section 69a and a non-adjustable section 69b, details of which are shown in Figures 22 to 30 inclusive. The cam section 69b is fixed to a hub 78 which is splined at 79 (see Figure 5) on the guide sleeve 60. The hub 78 has threaded connection as at 80 with a shaft 81 extending through the column 30 and the guide sleeve 60 and journaled at its lower end in a frame bearing 82. A collar 83 (see Figure 2) secured to the shaft rests upon a thrust bearing 84 which in turn is supported by the frame 10 adjacent the bearing 82, thus supporting the shaft 81 against downward movement. Upward movement of the shaft is prevented by engagement with the bearing 82 of the hub 84 of a bevel gear 85 secured to the bottom end of the shaft. Rotation of the screw threaded upper end 80 of the shaft 81 in the threaded cam hub 78 causes the hub and the cam section 69b to be raised or lowered depending on the direction of rotation of the shaft. Means later to be described are provided for raising the adjustable cam section 69a when the non-adjustable section 69b has been raised by rotation of the shaft 81.

When it is desired to vary the capacity of the units F, only the cam section 69a is adjusted vertically by rotation of a hand wheel 86 mounted above the housing cover 87. The cover is formed with bosses 87a secured to the non-adjustable cam section 69b by screws 87b (see Figure 2). As shown in Figure 2 a spider 88 is connected to the cam section 69a by bolts 89 and spacers 90 extending through and being slidable with respect to the cam section 69b. The spider includes a hub 91 (see Figure 5) fitted with a bearing liner 92 formed at its lower end with a flange 93. A nut 94 screwed on the threaded upper end of the liner 92 cooperates with the flange 93 to hold the liner against vertical movement in the hub 91. Preferably the liner is keyed to the hub as at 95, and is threaded internally for cooperation with the externally threaded lower end of a shaft 96 which is bored to receive the upper end of the shaft 81. The shaft 96 extends up through a boss 99 in the cover 87 and a rim 100 on the shaft is engageable with the bottom of the cover boss 99. The hand wheel 86 is keyed to the shaft 96 as at 101 but is adapted to have slight axial movement with respect to the shaft 96. A washer 102 is interposed between the bottom of the hand wheel 86 and the top of the cover boss 99. A lock wheel 103 has threaded engagement with the upper reduced end 104 of the shaft 96.

When it is desired to adjust the vertical position of the cam section 69a, the lock wheel 103 is loosened so as to permit the hand wheel 86 to turn freely on the cover boss 99. The hand wheel 86 is then rotated in the desired direction, thereby raising or lowering the spider 88 by the co-operation of the threaded parts 96 and 92 with consequent changing of the elevation of the adjustable cam section 69a. This adjustment of the cam section 69a for varying the capacity of the units F will take place without any movement of the cam section 69b.

An indicator is provided for showing the adjustment of the cam section 69a and therefore showing the capacity of the filling units F. In the form shown a plate 105 provided with scale markings is mounted on the cover 87 and a rod 106 extending upwardly from the spider 88 and slidably through the cover 87 carries a pointer 107 operatively associated with the scale plate 105.

When the filling units are to be cleaned the shaft 81 is driven through the bevel gear 85 at the lower end of the shaft. The bevel gear 85 is in mesh with a bevel gear 108 on a shaft 109 rotatable by a crank 110 (see Figures 2 and 3). The crank 110 is turned to rotate the shaft 81 which by virtue of the threaded connection at 80 raises the cam section 69b. The top of the cam section 69b will then lift the spider and the adjustable cam section 69a which is connected to the spider by the screws 89. The cover 87, connected to the cam section 69b by the bosses 87a and screws 87b, also will be raised. Upward movement of the cam sections 69a and 69b will be continued until the top of the hub 78 engages collars 111 secured to the upper ends of rods 112 anchored at their bottom ends in the lower cam 58. Thereafter further upward movement of the cam sections 69a and 69b will lift the rods 112 so as to raise the bottom cam 58 and move the spouts 1 above the guide table 2. The rods 112 and collars 111 thus constitute lost motion connecting means for lifting the spouts 1 above the table 2 after the plungers 3 have been withdrawn from the spouts.

Upward movement of the cams 58 and 69a—69b is limited by engagement of the lower cam 58 with collars 113 on the top of stop rods 114 secured at their lower ends in the stationary bearing 62.

The adjustable cam section 69a is illustrated in detail in Figures 22 to 26 inclusive. It includes a top 300 drilled and tapped at 301 for receiving the screws 89 which secure the section 69a to the spider 88. Surfaces 302 are finish machined for sliding engagement with a cylindrical part of the cam section 69b. The groove 303 in the cam section 69a is flared at its ends 304 and 305 so that the rollers 68 will pass from the groove in cam section 69b freely into the groove 303 and vice versa when the cam section 69a is in different positions vertically with respect to the cam section 69b.

The non-adjustable cam section 69b is shown in detail in Figures 27 to 30 inclusive. Its top 400 is drilled at 401 for accommodating the spacers 90 interposed between the spider 88 and the adjustable cam section 69a. The top 400 also is drilled and tapped at 402 for receiving the screws 87b by which the cam section 69b is secured to the cover bosses 87a. A cylindrical part 403 is smoothly finished on its outer surface for sliding engagement with the finished surfaces 302 on the cam section 69a. An overhanging part 404 integral with the cylindrical part 403 is formed with a cam groove 405 having flared ends 406 and 407 adapted to match up with the flared ends of the groove 303 in the cam section 69a.

The groove 303 in the cam section 69a includes that portion of the whole cam surface 303—405 which the follower rollers 68 engage when the plungers 3 are fully retracted. Thus, vertical adjustment of the cam section 69a will vary the extent of retraction of the plungers and consequently will vary the capacity of the spouts 1.

As shown in Figures 3, 6 and 7 the manifold 4 has its mouth 5 formed arcuately and opening upwardly so as to be passed over by the table 2 and spouts 1. The manifold includes a neck 115 adapted to be connected to a commercial meat stuffer (not shown) of any suitable or conventional kind. As shown in Figure 6 a gib 116 secured to the supply manifold by bolts 117 is adapted to extend over the marginal portion of the table 2 for holding the table down on the manifold against the pressure of the material in the manifold. For the same purpose a gib 118 bolted as at 119 to the table 2 slides under an overhanging flange on the manifold. Preferably the manifold has its bottom 120 removable so as to facilitate cleaning.

As shown in Figure 3 the whole supply manifold assembly is pivoted on the frame 10 as at 121 so that it may be swung from under the table 2 to facilitate cleaning. A latch device 122 is provided for maintaining the manifold in operative position.

The location of the spray gun 8 previously referred to is shown in Figure 3. It is so positioned as to direct a spray of hot lard on the bottom of the table 2 and the bottoms of the spouts 1 and plungers 3 while they are approaching the manifold 4.

The can feeding mechanism A, the filling mechanism B, and the filled can discharge mechanism C are all driven in timed relation by a motor 123. The driving connections are shown schematically in Figure 14 and reference to this figure in connection with the illustrations of the preferred apparatus structure will be helpful in considering the driving mechanism. The motor 123 (shown in Figure 2) is connected by a pulley and belt drive 124 to a shaft 125 journaled as at 126 in a gear housing 127. The shaft 125 is adapted to be connected through a main control clutch 128 to a shaft 129 journaled in the housing 127 as at 130 and 131. Fast with the shaft 129 is a worm 132 meshing with a worm wheel 133 which drives a vertical shaft 134 through a safety or overload release clutch 134a. Fast to the upper end of the shaft 134 is a spiral gear 135 in mesh with a spiral gear 136 secured to a horizontal shaft 137 to which is secured one sprocket 138 for driving the discharge chain 35.

For driving the discharge transfer turret 31, a gear 139 fast on the shaft 134 meshes with a gear 140 secured to the discharge turret shaft 32.

The main or filling turret 27 and the filling units F and other parts carried by the turret are driven from the gear 140 by a gear 141 meshing therewith and bolted to the bottom end of the turret 27.

The transfer turret 22 is driven by its shaft 23 secured to which is a gear 142 meshing with the main turret gear 141.

The feeding conveyor chain 13, the timing screw 14, the pusher feed chain 15, and the expander wheel 17 are all driven by a gear 143 in mesh with the gear 142 and which drives a shaft 144 through a safety or overload release clutch 144a. The shaft 144 drives the feed chain 13 through the medium of a bevel gear 145 fast on the shaft 144, a bevel gear 146 fast on a shaft 147, and one feed chain sprocket 148 secured to the shaft 147.

The timing screw 14 is driven from the other feed chain sprocket 149. The sprocket 149 is fast on a shaft 150 secured to which is a gear 151 meshing with a gear 152 connected to a shaft 153. A bevel gear 154 on the shaft 153 meshes with a bevel gear 155 secured to the shaft 156 on which the timing screw 14 is mounted.

For driving the pusher chain 15, a bevel gear 157 secured to the shaft 147 meshes with a bevel gear 158 secured to a shaft 159 which carries a bevel gear 160 meshing with a bevel gear 161 fast on a vertical shaft 162 to which one pusher chain sprocket 163 is connected. The other pusher chain sprocket is shown at 164.

The expander wheel 17 is driven from a spiral gear 165 fast on the shaft 144 and meshing with a spiral gear 166 secured to the expander wheel shaft 18.

Figure 13:
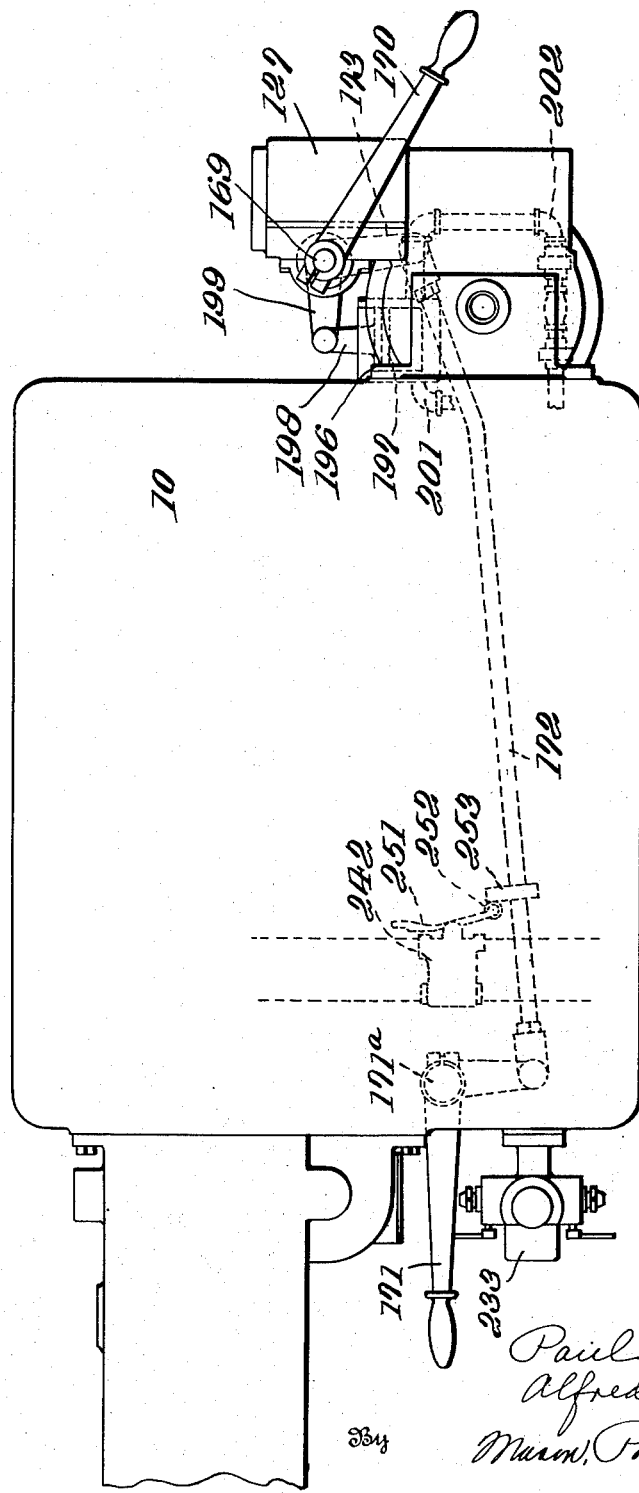
Figure 13 is a top plan view of the lower portion of the apparatus base, a gear transmission housing, control clutch operating mechanism and valve mechanism.

Thus all of the can handling mechanism and the filling mechanism are driven in timed relation from the motor 123. The operation of all of the parts may be stopped by opening the main control clutch 128. For this purpose the clutch is provided with a shifting device 167 actuatable by a fork 168 mounted on a rock shaft 169 provided with a lever 170 positioned at the right hand end of the machine as shown in Figures 3 and 13. The clutch 128 also may be engaged or disengaged conveniently by means of a lever 171 pivoted as at 111a adjacent the left end of the machine and being connected by a link 172 to an arm 173 on the rock shaft 169.

Figure 11:
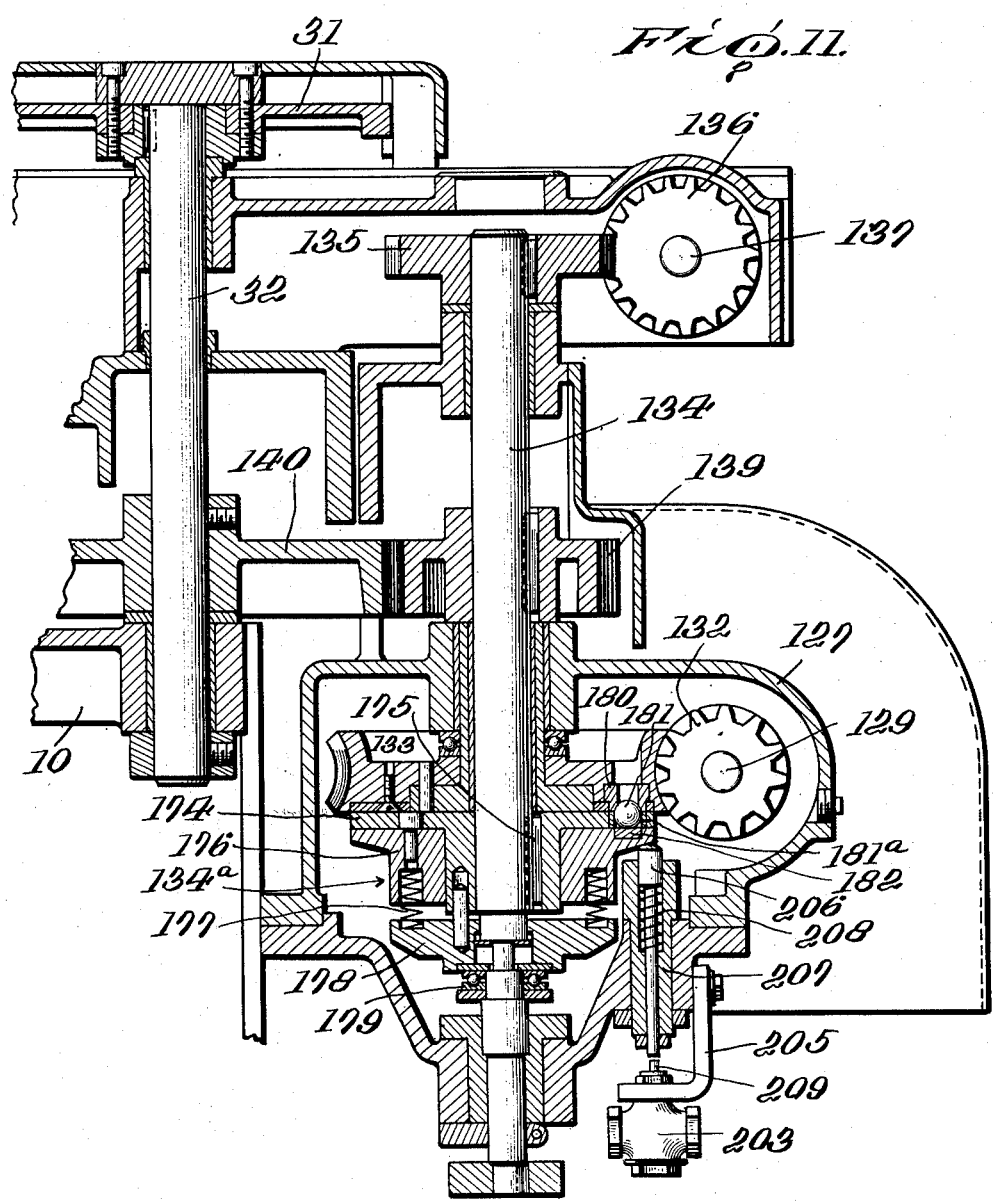
Figure 11 is an enlarged scale fragmentary vertical sectional view of drive transmitting mechanism including a safety or overload release clutch.
Figure 12:
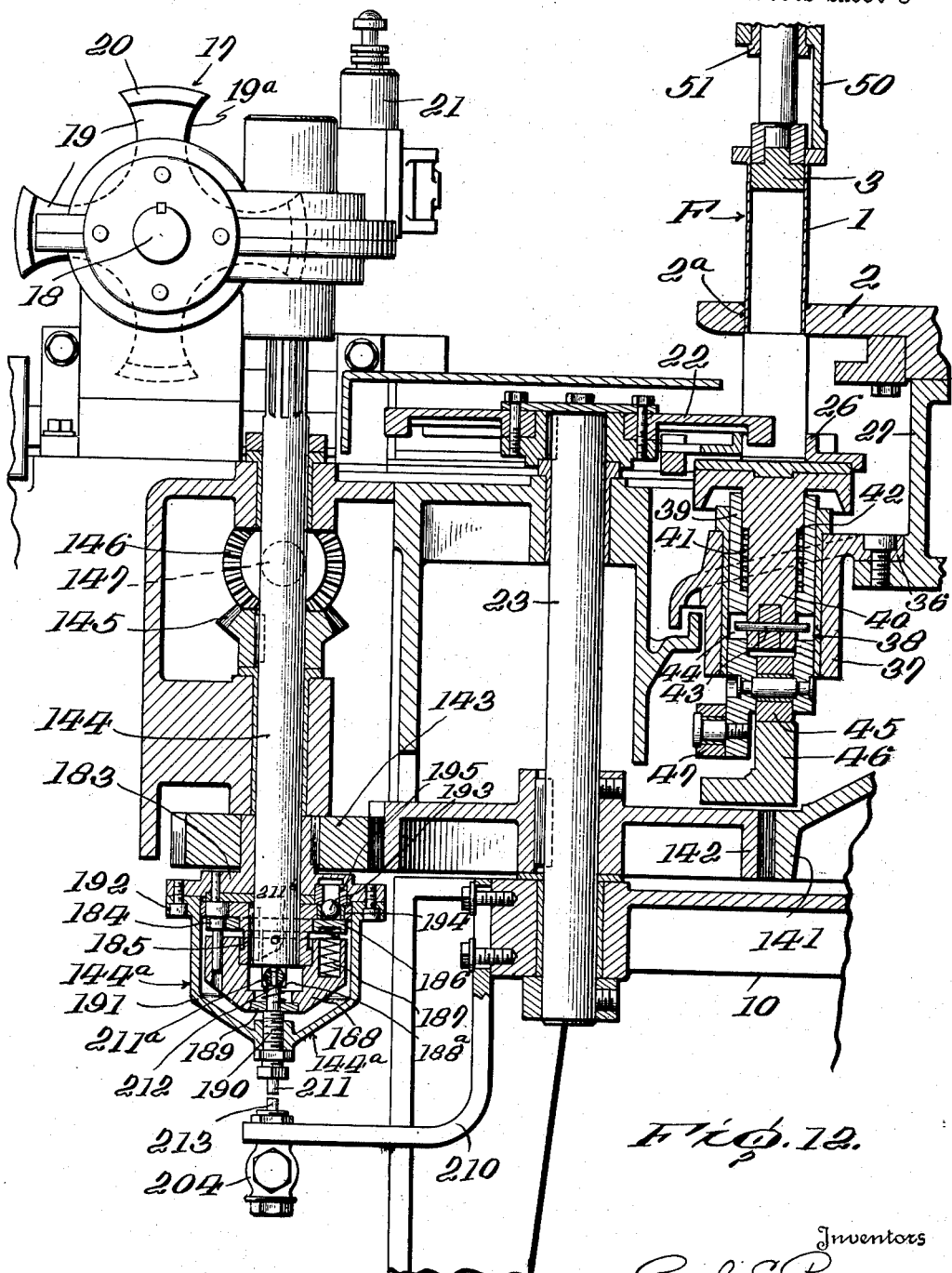

The safety clutches 134a and 144a may be of a known or conventional construction. A suitable form for the clutch 134a is shown in Figure 11. The worm wheel 133 is mounted to rotate freely on the shaft 134 immediately above a clutch plate 174 keyed to the shaft 134 as at 175. The plate 174 is urged toward the worm wheel by a pressure collar 176 yieldably held against the plate 174 by springs 177 interposed between the collar 176 and a flange 178 held against downward movement by a thrust bearing 179 on the shaft 134. The worm wheel 133 is equipped with a plurality of cups 180 forming seats for balls 181 held in sleeves 181a in the plate 174 and seated on an insert 182 in the collar 176.

In operation, and when normal load is being transmitted, the worm wheel 133 will drive the clutch plate 174 through the balls 181. Should the load increase, due for example to the jamming of a can, the springs 177 will yield to permit the collar 176 and clutch plate 174 to move downwardly thereby allowing the balls 181 to move out of the cups 180 whereupon the worm wheel 133 will turn idly on the shaft 134 without driving the clutch plate 174 and shaft 134.

The clutch 144a is of a somewhat similar construction shown in Figure 12. The driven gear 143 is fast with a hub flange 183 mounted to rotate freely on the shaft 144. A clutch plate 184 is keyed to the shaft 144 as at 185 immediately below the hub flange 183. The clutch plate 184 is urged upwardly by a pressure collar 186 under the action of springs 187 interposed between the collar 186 and a flange 188 held against downward movement on the shaft 144 by a disk 189 which is supported by a sleeve 190 screwed into a housing 191 bolted as at 192 to the hub flange 183. Balls 193 held in cups 194 in the clutch plate 184 are adapted to extend into cups 195 in the hub flange 183.

In operation, if a jam should occur in the feeding mechanism A, the springs 187 will yield to permit the clutch plate 184 to move downwardly so that the balls 193 will become unseated from the cups 195 whereupon the gear 143 and hub flange 183 will turn idly without driving the clutch plate 184 and shaft 144.

Releasing of either of the safety clutches 134a—144a will open the main clutch 128 for stopping the drive to all of the mechanism A, B, and C. As shown in Figure 13, the gear housing 127 is formed with a cylinder 196 in which is mounted a piston 197 connected by a rod 198 to a lever 199 fast with the rock shaft 169. When air is admitted to the cylinder 196, the piston is pushed outwardly so as to rock the lever 199 and shaft 169, thereby shifting the main clutch element 167 to interrupt the drive.

Figure 18 shows diagrammatically a pneumatic system for supplying air to the cylinder 196. A main air supply conduit 200 communicates with branches 201 and 202 which lead respectively through valves 203 and 204 to the cylinder 196. Opening of either of the valves 203, 204 will admit air to the cylinder 196, operate the piston 197 and disengage the main clutch 128.

The valve 203 is mounted on a bracket 205 suspended from the gear housing 127, and is adapted to be opened in response to releasing of the safety clutch 134a. A plunger 206 reciprocable in a fixed sleeve 207 is urged into contact with the pressure collar 176 by a spring 208. The lower end of the plunger is adapted to engage the top of a valve stem 209. When the clutch 134a releases, the pressure collar 176 is moved downwardly in the manner previously explained, thereby pushing down on the plunger 206 which in turn moves the valve stem 209 to open the valve 203.

The valve 204 is carried by a bracket 210 suspended from the main frame 10. A plunger 211 extends down through the sleeve 190 and is connected at its upper end to the portion 211a of a U-shaped member having upwardly extending legs 211b which pass freely through slots 188a in the flange member 188 and abut the bottom surface of the collar 186 with which the legs 211b are held in yielding engagement by a spring 212. The lower end of the plunger 211 overlies the top of a valve stem 213. If a jam should occur in the feeding mechanism A, the collar 186 will be moved downwardly to push the U-shaped member 211a—211b and the plunger 211 against the urge of the spring 212 and press the valve stem 213 so as to open the valve 204.

In preparing the machine for operation or for making adjustments, it may be desirable to move the parts slowly. This may be accomplished by disengaging the main control clutch 128 and turning a hand wheel 214 on the shaft 129. Normally the hand wheel 214 is not connected to turn with the shaft 129, but it may be moved to the left as viewed in Figure 10 so as to be engaged with a member 215 secured to the shaft 129 by a pin 216.

Figure 19 shows diagrammatically the layout of a system for supplying hot lard to the spray guns 8 and 21 and automatically controlling the spraying of lard from the guns. A lard tank 217 is provided for containing a supply of lard maintained at a desired temperature by steam introduced through an inlet 218 controlled by a thermostatic valve 219. Hot lard is drawn through a conduit 220 by a pump 221 which delivers lard through a conduit 222 to a pressure regulating valve 223. Lard flowing from the valve 223 passes through a manually operated flow back valve 224 to a conduit 225 which leads to the spray gun 8. The gun 8 is adapted to be operated for spraying hot lard by pneumatic means later to be described. Hot lard is pumped continuously through the conduit 225, the surplus which is not delivered by the gun 8 being passed on through a conduit 226 to the spray gun 21, which also is pneumatically controlled in a manner to be described. Lard not delivered through the spray gun 21 is passed on through a conduit 227 back to the supply tank 217. Preferably a throttle valve 228 is interposed in the conduit 227 and conveniently positioned with respect to the valve 228 is a gauge 229 for indicating the lard pressure in the return line as established by the setting of the throttle valve 228.

Lard drawn in by the pump 221 in excess of that which is discharged through the conduit 222 and the communicating conduits is returned to the tank 217 through a conduit 230 controlled by a relief valve 230a.

Normally the flow back valve 224 is open so that lard will circulate through the conduits referred to above and will be maintained always in readiness to be delivered by the spray guns 8 and 21.

The spray guns may be of a well known commercial type in which low pressure air is provided for atomizing the lard and high pressure air is provided for opening the lard and atomizing air valve. The gun 8 is shown as including an atomizing air connection 8a and a valve operating air connection 8b. Similarly the gun 21 includes an atomizing air connection 21a and an operating air connection 21b.

A supply line 231 provides a source of both high pressure air and low pressure air for use in connection with the spray guns. The line 231 is connected through a manually operable valve 232 to an air transformer 233 which may be of any approved construction. The transformer 233 delivers high pressure air through a conduit 234 and low pressure air through a conduit 235. Both the conduits 234 and 235 lead to a single manually operable valve structure 236.

Low pressure air passed through the valve 236 is led through a conduit 237 to a branch conduit 238 which is connected to the atomizing connection 21a of the spray gun 21. The low pressure conduit 237 communicates also with a branch conduit 239 connected to the atomizing connection 8a of the spray gun 8. Thus low pressure air is available at both guns 8 and 21 whenever the valve 236 is set to permit the passage of low pressure air.

During normal operation, high pressure air is applied to the valve operating connection 21b of the gun 21 each time a can moves adjacent the gun, the application of the air being controlled automatically by a valve 240. High pressure air is applied to the connection 8b of the gun 8 under control of a valve 241 operated periodically and preferably once during each revolution of the turret 27. Application of high pressure air to both operating connections 8b and 21b is controlled by a cut-off valve 242 which supersedes the controls effected by the valves 240 and 241 and which is adapted to be closed automatically if the main clutch 128 is disengaged. However, in normal operation the valve 242 remains open and the valves 240 and 241 effect admission of high pressure air periodically to the operating connections 21 and 8 respectively. The mechanism for operating the valves 240, 241, and 242 will be explained after the description of the system or layout shown in Figure 19 has been completed.

A conduit 243 leads from the high pressure outlet side of the manually operable valve 236 to the clutch controlled automatic valve 242. An outlet connection 244 from the valve 242 communicates with a branch conduit 245 leading to the valve 240. A conduit 246 leads from the valve 240 to the operating connection 21b of the can spraying gun 21. Another branch conduit 247 leads from the outlet connection 244 to the valve 241 which is connected by a conduit 248 to the operating connection 8b of the table spraying gun 8.

When the machine is stopped, it is necessary to remove the lard from the lard circulating system before it cools in order that it will not harden or freeze in the conduits. In order that the lard conduits may readily be cleared out, a conduit 249 is arranged to deliver high pressure air from the transformer 233 through a manually operable flow back valve 250 to the lard conduit 225. During normal operation, the valve 250 is closed and the flow back valve 224 is opened so that fluid lard may flow from the pump 221 through the conduit 222, the valves 223 and 224, the conduit 225, the conduit 226, the conduit 227, and the valve 228 back to the tank 217. In order to clear the lard conduits, the flow back valve 224 is closed and the flow back valve 250 is opened so as to permit high pressure air from the conduit 249 to flow into the conduit 225 and connected conduits so as to force the fluid lard back into the tank 217.

Mechanism for actuating the valve 242 in response to opening of the clutch 128 is shown in Figure 13. The valve 242 is fitted with an operating lever 251 equipped with a roller 252 engaged by a collar 253 on the link 172. If the clutch 128 is disengaged, the link 172 will move to the left as viewed in Figure 13 so as to rock the lever 251 and close the valve 242.

Mechanism for operating the valve 240 to effect spraying of each can as it moves to a position adjacent the gun 21 is shown in Figures 15, 16 and 17. The valve 240 is provided with plungers 254 and 255 controlling flow of high pressure air through the conduit 246. The plungers are adapted to be operated by screws 256 and 257 adjustably mounted on a valve actuating arm 258 pivoted as at 259. Rocking of the arm 258 counterclockwise as viewed in Figure 16 under the urge of a spring 260 will cause the valve 240 to be opened so as to admit high pressure air through the conduits 245 and 246 to the connection 21b on the gun 21.

The valve actuating arm 258 is operated under the conjoint control of a cam generally designated 261 cooperable with a follower roller 262 on the arm 258, and mechanism generally designated 263 which prevents opening of the valve except when a can is positioned to be sprayed by the gun 21. The mechanism 263 includes a latch lever 264 having a hub 265 pivoted on a pin 266. The lever 264 is equipped with a latch block 267 cooperable with a latch block 268 carried by the valve actuating arm 258 for releasably maintaining the arm 258 in its valve closing position. For releasing the latch lever 264 to permit operation of the valve under control of the cam 261, a bell crank lever 269 pivoted as at 270 has one arm 271 equipped with a roller 272 disposed in the path of cans 6 moving past the spray gun 21. Another arm 273 of the bell crank lever 269 is connected through an adjustable link 274 to an arm 275 fast with the latch lever hub 265.

In operation when a can 6 moves into engagement with the roller 272, the bell crank lever 269 is rocked so as to move the link 274 and rock the latch lever 264 and disengage the latch block 267 from the latch block 268, thereby enabling the spring 260 to cause the roller 262 to follow the contour of the cam 261.

The cam 261 comprises two plates 276 and 277 mounted on the shaft 147. The cam plates may be adjusted angularly about the shaft 147 and relatively to each other so as to vary the timing and duration of opening of the valve 240. For this purpose the plate 276 is mounted on the shaft 147 by screws 278 passing through arcuate slots 279 in the plate 276 and having threaded engagement with a hub 280 keyed to the shaft 147 at 281. The cam plate 277 is held in adjusted position by screws 282 passing through arcuate slots 283 in the plate 276 and having threaded engagement with the plate 277.

In operation, the cam 261 rotates continuously but has no effect on the valve 240 unless and until the mechanism 263 releases the valve actuating arm 258 in response to positioning of a can 6 adjacent the gun 21. When the arm 258 is released, the follower roller 262 will move into contact with the cam 261 until a rise portion 261a on the cam moves the roller 262 to restore the actuating arm 258 to its valve closing position. This will take place before the next can is due to arrive at the gun 21, and the mechanism 263 again will latch the arm 258 in its valve closing position.

The valve 241 controlling the application of high pressure air to the gun 8 is mounted on the frame 10 on the approach side of the manifold 4. As shown in Figure 4, a lever 284 pivoted as at 285 is equipped with a follower roller 286 adapted to be engaged by a cam 287 secured to the table 2. Thus, once during each revolution of the turret 27 the cam 287 will operate the lever 284 to open the valve 241 and admit high pressure air to the gun 8 for spraying lard on the bottom of the table 2.

*Operation*

To prepare the apparatus for operation, the lard in the tank 217 is brought up to the proper temperature, the flow back valve 250 is closed, and the manually operable valves 232, 236, and 224 are opened. The pump 221 is started and the throttle valve 228 is adjusted if necessary. The motor 123 is then started and the clutch 128 engaged.

The mechanism A, B and C will then be driven in the manner previously described and cans 6 will be fed to the table 12 and feed conveyor chain 13. As each can is forwarded by the pusher chain 15, an arm of the expander wheel 17 will enter the can and reshape it if it has been partially collapsed. After leaving the expander wheel 17, each can will pass under the gun 21 and will be sprayed with hot lard when the valve 240 is opened in response to engagement of the can with the bell crank roller 272. The properly shaped cans will then be forwarded to the filling mechanism B wherein the filler units F will be operated in the sequence shown diagrammatically in Figure 1 to fill the cans in the manner previously described. Once during each rotation of the turret 27 and the units F the table 2 will be sprayed with hot lard by opening of the valve 241.

If a jam should occur in the feeding mechanism A or if an inverted can should be presented to the expander wheel 17, the safety clutch 144a will release thereby opening the valve 204 to effect disengagement of the main drive clutch 128. Similarly if a jam should occur in the feeding mechanism B or the discharge mechanism C, the safety clutch 134a will release so as to open the valve 203 and effect disengagement of the clutch 128. When the clutch 128 is opened for any reason, the valve 242 will be closed so that it will not be possible for grease to be sprayed from the guns 8 and 21. Therefore, when the clutch 128 is opened to enable the apparatus to be operated slowly by means of the hand wheel 214 for making necessary adjustments or cleaning, the opening of the valves 240 and 241 cannot effect the spraying of lard.

When the machine is stopped, the lard lines are cleaned out by closing the valve 224 and opening the valve 250.

The method and apparatus disclosed herein are respectively the preferred manner of and mechanism for practicing the invention, but it will be understood that changes may be made without departing from the invention as defined in the claims.

We claim:

1. A container filler comprising a rotatable turret, a plurality of filling units carried thereby, a table carried by said turret and having an opening for each filling unit, a container carrier beneath each opening, each of said filler units including a measuring spout disposed in a table opening and movable into the container beneath the same, a stationary cam for operating said spouts, a plunger associated with each spout and movable relative thereto for permitting loading and for discharging the contents of the spout into said container, a stationary cam for reciprocating said plungers and means for shifting both of said cams axially of the turret for withdrawing the spouts from the openings in the table and the plungers from the spouts, said means including a lost motion connection whereby the plunger operating cam is first shifted to withdraw the plungers, after which the spout actuating cam is shifted for withdrawing the spouts.

2. A container filler comprising a rotatable turret, a plurality of filling units carried thereby, a table carried by said turret and having an opening for each filling unit, a container carrier beneath each opening, each of said filler units including a measuring spout disposed in a table opening and movable into the container beneath the same, a stationary cam for operating said spouts, a plunger associated with each spout and movable relative thereto for permitting loading and for discharging the contents of the spout into said container, a stationary cam for reciprocating said plungers, a shaft disposed axially of the turret, a support for the last-named cam connected to said shaft and shiftable axially of the turret by the rotation of said shaft, a support for said first-named cam and a lost motion connection between said cam supports whereby when said shaft is rotated the cam support for the plungers is first raised, after which the cam support for the spouts is raised and thereby the plungers and spouts separated from each other and the table for cleaning purposes.

3. A container filler comprising a rotatable turret, a plurality of filling units carried thereby, a table carried by said turret and having an opening for each filling unit, a container carrier beneath each opening, each of said filler units including a measuring spout disposed in a table opening and movable into the container beneath the same, a stationary cam for operating said spouts, a plunger associated with each spout and movable relative thereto for permitting loading and for discharging the contents of the spout into said container, a stationary cam for reciprocating said plungers, and means for shifting both of said cams axially of the turret for withdrawing the spouts from the openings in the table and the plungers from the spouts.

4. A container filler comprising a rotatable turret, a plurality of filling units carried thereby, a table carried by said turret and having an opening for each filling unit, a container carrier beneath each opening, each of said filler units including a measuring spout disposed in a table opening and movable into the container beneath the same, a stationary cam for operating said spouts, a plunger associated with each spout and movable relative thereto for permitting loading and for discharging the contents of the spout into said container, a stationary cam for reciprocating said plungers, means for individually adjusting the positions of the plungers relative to the plunger reciprocating cam, means for individually adjusting the positions of the spouts relative to the spout operating cam, and means for adjusting the relation of said cams for simultaneously varying the positions of the plungers in the spouts for varying the effective loading capacities of the spouts.

5. A container filler comprising a rotatable turret, a plurality of filling units carried thereby, a table carried by said turret and having an opening for each filling unit, a container carrier beneath each opening, each of said filler units including a measuring spout disposed in a table opening and movable into the container beneath the same, a stationary cam for operating said spouts, a plunger associated with each spout and movable relative thereto for permitting loading and for discharging the contents of the spout into said container, a stationary cam for reciprocating said plungers, means for moving one said cam axially of the turret, and means for causing the other of said cams to move with the first moved cam after a predetermined amount of movement thereof thereby to sequentially move the plungers and spouts clear of the table and each other for cleaning purposes.

6. A container filler comprising a rotatable turret, a plurality of filling units carried thereby, a table carried by said turret and having an opening for each filling unit, a container carrier beneath each opening, each of said filler units including a measuring spout disposed in a table opening and movable into the container beneath the same, a stationary cam for operating said spouts, a plunger associated with each spout and movable relative thereto for permitting loading and for discharging the contents of the spout into said container, a stationary cam for reciprocating said plungers, means for moving one said cam axially of the turret, and rods extending from one cam through apertures in the other cam and having heads thereon engageable with said other cam after a predetermined amount of movement of said one cam for moving said other cam with said one cam to effect a withdrawal of the plungers from the spouts and the spouts from the table openings.

7. In a container filling apparatus, a frame; a table mounted for rotation on said frame; a plurality of circumferentially spaced openings in said table; a plurality of members mounted on one side of said table for rotation with said table and being respectively aligned with said openings for receiving flowable material passed through the respectively associated openings; a manifold for containing flowable material under pressure and having a face normally in sliding sealing engagement with the other side of said table and having a mouth opening through said face for registration with said table openings as they pass over the manifold; a scraper knife engaging the under surface of the table adjacent the manifold at the approach side of said manifold; and means for spraying a lubricant against said table surface between the knife and said manifold.

PAUL E. PEARSON.
ALFRED TREFF.

REFERENCES CITED

The following references are of record in the file of this patent:

UNITED STATES PATENTS

| Number | Name | Date |
|---|---|---|
| 1,490,923 | Hansen | Apr. 22, 1924 |
| 1,869,232 | Weiland | July 26, 1932 |
| 2,336,415 | Nordquist | Dec. 7, 1943 |
| 2,341,477 | Pearson | Feb. 8, 1944 |